(12) United States Patent
Mital

(10) Patent No.: US 7,814,744 B2
(45) Date of Patent: Oct. 19, 2010

(54) OPTIMIZED NOX REDUCTION SYSTEM

(75) Inventor: Rahul Mital, Rochester Hills, MI (US)

(73) Assignee: GM Global Technology Operations, Inc.

( * ) Notice: Subject to any disclaimer, the term of this patent is extended or adjusted under 35 U.S.C. 154(b) by 294 days.

(21) Appl. No.: 11/466,927

(22) Filed: Aug. 24, 2006

(65) Prior Publication Data

US 2008/0047258 A1    Feb. 28, 2008

(51) Int. Cl.
*F01N 3/00* (2006.01)
(52) U.S. Cl. ............... 60/286; 60/274; 60/295; 60/301; 60/303
(58) Field of Classification Search ............... 60/286, 60/295, 301, 303, 274
See application file for complete search history.

(56) References Cited

U.S. PATENT DOCUMENTS

| | | | | |
|---|---|---|---|---|
| 5,727,385 A * | 3/1998 | Hepburn | ............... | 60/297 |
| 6,089,015 A * | 7/2000 | Strehlau et al. | ............... | 60/274 |
| 6,185,929 B1 * | 2/2001 | Ishizuka et al. | ............... | 60/274 |
| 6,293,096 B1 * | 9/2001 | Khair et al. | ............... | 60/286 |
| 7,051,520 B2 * | 5/2006 | Nagaoka et al. | ............... | 60/297 |
| 7,063,642 B1 * | 6/2006 | Hu et al. | ............... | 477/100 |
| 7,401,462 B2 * | 7/2008 | Naik et al. | ............... | 60/274 |

* cited by examiner

*Primary Examiner*—Thomas E Denion
*Assistant Examiner*—Diem Tran

(57) ABSTRACT

An exhaust after-treatment system for an internal combustion engine includes a lean NOx catalyst having an exhaust stream from the internal combustion engine flowing therethrough. A NOx absorber catalyst is downstream of the lean NOx catalyst. The NOx absorber is selectively regenerated to increase a NOx reduction efficiency of the exhaust after-treatment system.

8 Claims, 2 Drawing Sheets

OPTIMIZED NOX REDUCTION SYSTEM

FIELD OF THE INVENTION

The present invention relates to internal combustion engines, and more particularly to an optimized NOx reduction exhaust system.

BACKGROUND OF THE INVENTION

Internal combustion engines generate drive torque by combusting an air and fuel mixture within cylinders. Exhaust that is generated via the combustion process is exhausted from the cylinders and is treated in an after-treatment system. During the combustion process, fuel is oxidized and hydrogen (H) and carbon (C) combine with air. Various chemical compounds are formed including carbon dioxide ($CO_2$), water ($H_2O$), carbon monoxide (CO), nitrogen oxides (NOx), unburned hydrocarbons (HC), sulfur oxides (SOx), and other compounds.

The after-treatment systems traditionally include a catalytic converter that reduces exhaust emissions by chemically converting the exhaust gas into carbon dioxide ($CO_2$) nitrogen (N), and water ($H_2O$). In some cases, a lean NOx catalyst is implemented. Lean NOx technology, also known as HC selective catalytic reduction (SCR) has various formulations (e.g., platinum/alumina, copper and substituted zeolite. Platinum on alumina ($Pt/Al_2O_3$) functions at law temperatures has higher peak conversion of approximately 40% at 225° C., but has a very narrow temperature window of operation (e.g., between 180-280° C.). As a result, this formulation is not very useful by itself. Another disadvantage of platinum catalysts has been their SOx oxidation activity and if's susceptibility to deactivation by sulfur.

NOx absorbers have also been developed based on acid-base wash-coat chemistry. The $NO_x$ is absorbed and is stored in the NOx absorber catalyst wash-coat during lean operating conditions (i.e., higher than stoichiometric air to fuel ratio). The NOx is released and is catalytically converted to nitrogen during rich operating conditions (i.e., lower than stoichiometric air to fuel ratio). Barium-based NOx absorbers have high conversion efficiency but are only active at increased temperatures (e.g., greater than approximately 250° C.). Also, NOx absorbers require periodic desulfation.

SUMMARY OF THE INVENTION

Accordingly, the present invention provides an exhaust after-treatment system that overcomes the deficiencies of the above-described after-treatment technologies. The exhaust after-treatment system includes a lean NOx catalyst having an exhaust stream from said internal combustion engine flowing therethrough. A NOx absorber catalyst is downstream of the lean NOx catalyst. The NOx absorber is selectively regenerated to increase the NOx reduction efficiency of the exhaust after-treatment system.

In another feature, the NOx absorber catalyst is regenerated when the NOx reduction demand is greater than a high threshold.

In another feature, the lean NOx catalyst alone reduces a NOx content of the exhaust stream when a NOx reduction demand is less than a low threshold.

In still other features, hydrocarbon (HC) is introduced into the exhaust stream when a NOx reduction demand is greater than a first threshold and is less than a second threshold. The HC is introduced via at least one of spark advance, post-combustion in-cylinder fuel injection and in-exhaust injection downstream of the internal combustion engine.

In yet another feature, the exhaust after-treatment system further includes a hydrocarbon (HC) dosing unit disposed upstream of one of the lean NOx catalyst and the NOx absorber catalyst.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
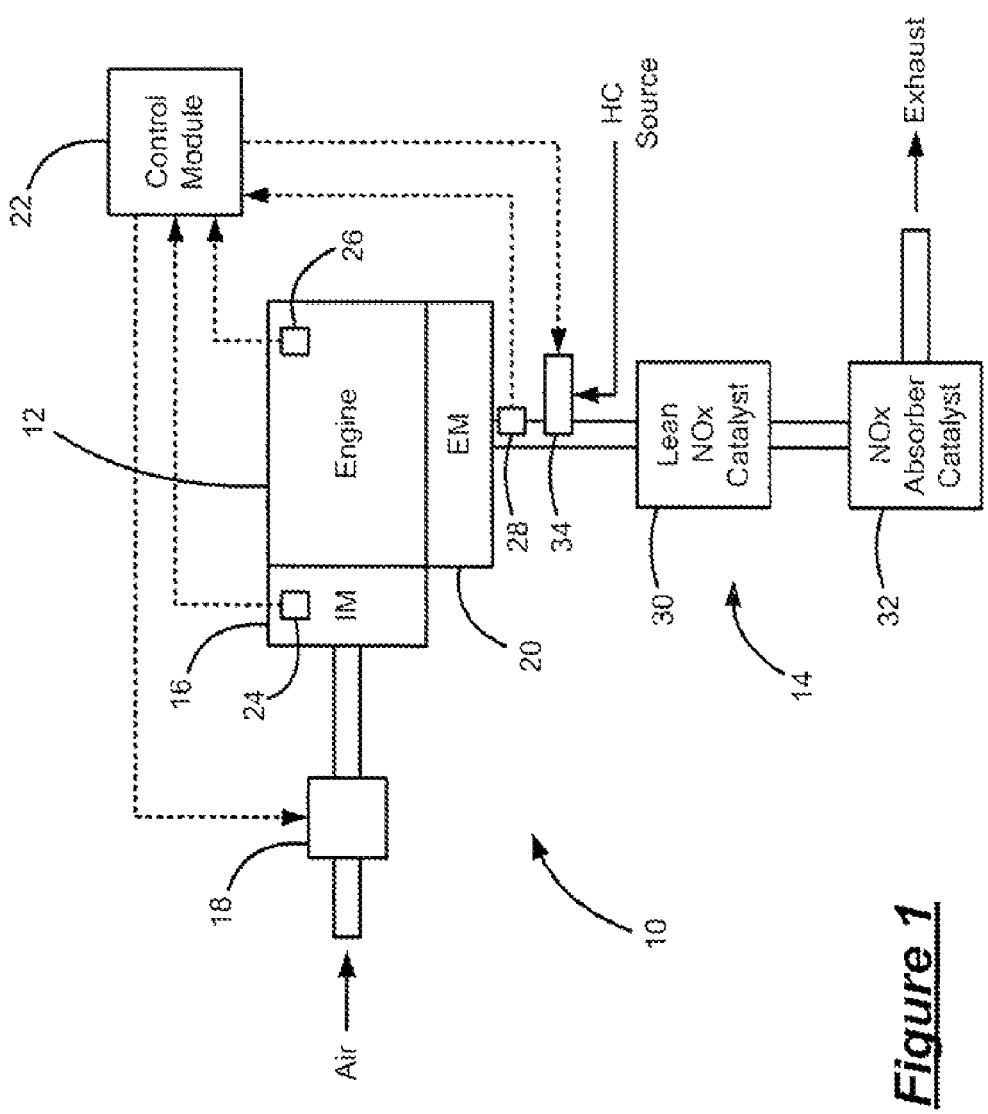
FIG. 1 is a functional block diagram of an engine system including an optimized NOx reduction exhaust system in accordance with the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated or group) and memory that execute one or more software or firmware programs, a combinational logic circuit, and/or other suitable components that provide the described functionality.

Referring now to FIG. 1, an engine system 10 includes an internal combustion engine 12 and an optimized NOx exhaust system 14 in accordance with the present invention. The engine 12 generates drive torque that is used to propel a vehicle within which the engine system 10 is implemented, and/or drive accessory loads including, but not limited to, an alternator and a fluid pump (not shown). Air is drawn into an intake manifold 16 through a throttle 18. The air is distributed to cylinders (not shown) of the engine 12 and is mixed with fuel to form a combustion mixture. The combustion mixture is ignited within the cylinder to reciprocally drive a piston (not shown). The combustion processes generates exhaust gas that exits the engine 12 through an exhaust manifold 20 and that is treated in the optimized NOx exhaust system 14.

A control module 22 regulates operation of the engine system 10 based on various engine system operating conditions. A manifold absolute pressure (MAP) sensor 24 is responsive to the vacuum pressure within the intake manifold 16 and generates a MAP signal based thereon. An engine RPM sensor 26 is responsive to an engine RPM and generates a signal based thereon. An exhaust temperature sensor 28 is disposed downstream of the exhaust manifold 20 and is responsive to the exhaust temperature ($T_{EXH}$) and generates a signal based thereon.

The optimized NOx exhaust system 14 includes a lean NOx catalyst 30 disposed upstream of a NOx absorber catalyst 32. An HC dosing unit 34 is disposed upstream of the lean NOx catalyst 30. The HC dosing unit 34 selectively injects HCs into the exhaust stream, which is used for lean NOx catalyst 30 and NOx absorber catalyst 32 regeneration and desulfation. It is also anticipated that post-combustion fuel injection can be implemented to increase the HC content of the exhaust stream, whereby fuel is injected into the cylinder to be exhausted from the cylinder with the exhaust. Further, advanced combustion (i.e. HCCl) includes relatively higher engine out HC levels. This increased HC level is effectively utilized to reduce NOx over the lean NOx catalyst 30 while oxidizing the remaining HCs to release thermal energy.

The combination of the lean NOx catalyst 30 and the NOx absorber catalyst 32 overcomes the shortcomings of the individual components. The so-configured optimized NOx exhaust system 14 enables the lean NOx catalyst 30 and the NOx absorber catalyst 32 to each be half the size if each were to be used individually. Because 75% of the NOx reduction occurs in the first half of the catalyst, for both the lean NOx catalyst 30 and the NOx absorber catalyst 32, reducing the size of each by half only reduces the NOx conversion efficiency by 25%.

Both active and passive lean approaches can be implemented based on the NOx conversion efficiency requirements and engine out HCs. During the active approach, HC dosing in the exhaust and/or in the cylinder (i.e., post combustion fuel injection) is enabled. Further, the optimized NOx exhaust system enables tunable NOx conversion efficiency. For example, if only 25-30% reduction is required under certain operating conditions, only the lean NOx catalyst 30 is used, while the NOx absorber catalyst 32 stays inactive. If higher efficiency is desired, the NOx absorber catalyst 32 is periodically regenerated to store and reduce NOx to nitrogen, as well. As a result, fuel consumption is reduced. Further, the NOx absorber catalyst also acts as a clean-up catalyst for $N_2O$ if so required.

During normal operation, if the engine out HC content is high and NOx reduction demand is low, no active control is required. The optimized NOx exhaust system 14 performs the required NOx reduction. If the NOx reduction demand increases, the HC content is increased to correspondingly increase the carbon to NOx ratio, thereby increasing the lean NOx reduction efficiency. If further NOx reduction is desired, the NOx absorber catalyst 32 can be periodically regenerated to store and convert NOx to $N_2$. In this manner, a wide range of NOx conversion is achieved, which would otherwise not be possible with the lean NOx catalyst 30 or the NOx absorber catalyst 32 alone. Also, fuel consumption can be reduced because the HC rich exhaust for the NOx absorber catalyst regeneration is not required all of the time. Further, because the NOx absorber catalyst 32 is not used all of the time, its life is prolonged.

Figure 2:
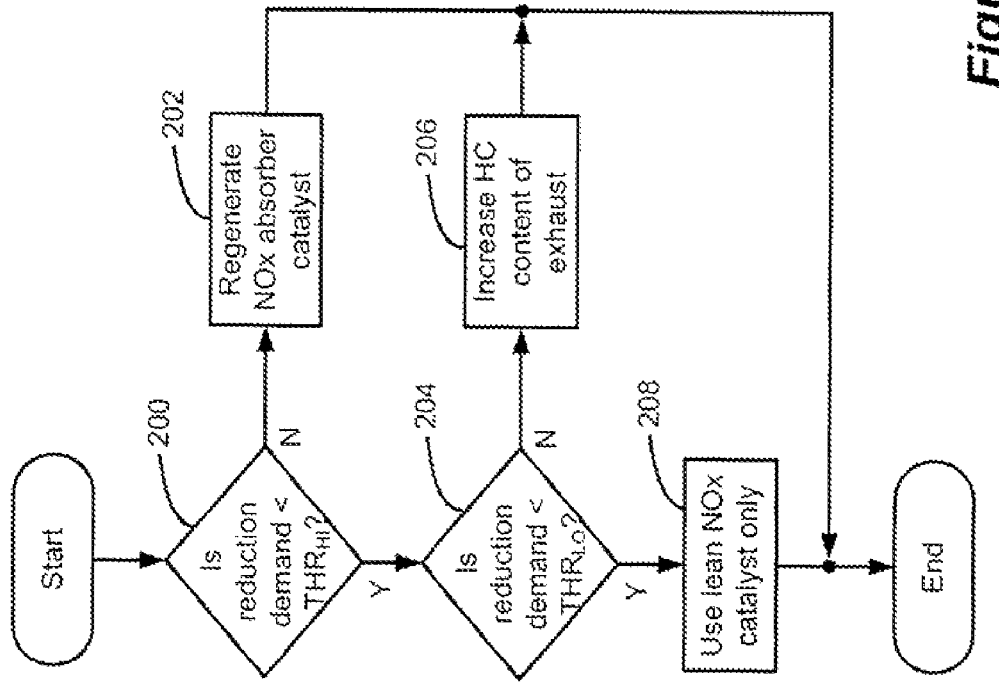
FIG. 2 is a flowchart illustrating exemplary steps executed using an optimized NOx reduction control of the present invention.

Referring now to FIG. 2, exemplary steps executed by the optimized NOx exhaust control will be described in detail. In step 200, control determines whether the NOx reduction demand is less than a high threshold ($THR_{HI}$) (e.g., 75%). If the NOx reduction demand is not less than $THR_{HI}$, control regenerates the NOx absorber in step 202 and control ends. In this manner, both the NOx absorber catalyst 32 and the lean NOx catalyst 30 are implemented to achieve the higher conversion efficiency. If the NOx reduction demand is not less than $THR_{HI}$, control continues in step 204.

In step 204, control determines whether the NOx reduction demand is less than a low threshold ($THR_{LO}$) (e.g., 30%). If the NOx reduction demand is not less than $THR_{LO}$, control increases the HC content of the exhaust in step 206 and control ends. In this manner, the conversion efficiency can be increased without regenerating the NOx absorber catalyst 32. If the NOx reduction demand is less than $THR_{LO}$, control uses the lean NOx catalyst only in step 208 and control ends.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An exhaust after-treatment system for an internal combustion engine, comprising:
   a lean NOx catalyst receiving an exhaust stream from said internal combustion engine;
   a NOx absorber catalyst downstream of said lean NOx catalyst, wherein said NOx absorber is selectively regenerated to increase a NOx reduction efficiency of said exhaust after-treatment system; and
   a control module that determines a NOx reduction demand, that initiates regeneration of said NOx absorber catalyst when said NOx reduction demand is greater than or equal to a first threshold, and that introduces hydrocarbons (HC) into said exhaust stream when said NOx reduction demand is less than said first threshold and greater than or equal to a second threshold.

2. The exhaust after-treatment system of claim 1 wherein said lean NOx catalyst reduces NOx in said exhaust stream when said NOx reduction demand is less than said second threshold.

3. The exhaust after-treatment system of claim 1 wherein said HC is introduced via at least one of post-combustion in-cylinder fuel injection and in-exhaust injection downstream of said internal combustion engine.

4. The exhaust after-treatment system of claim 1 further comprising a hydrocarbon (HC) dosing unit disposed upstream of said lean NOx catalyst.

5. A method of reducing a NOx content of an exhaust stream exiting an internal combustion engine, comprising:
   directing said exhaust stream through a lean NOx catalyst to reduce said NOx content of said exhaust stream;
   directing said exhaust stream through a NOx absorber catalyst that is disposed downstream of said lean NOx catalyst;
   determining a NOx reduction demand;
   initiating regeneration of said NOx absorber catalyst when said NOx reduction demand is greater than or equal to a first threshold; and
   introducing hydrocarbons (HC) into said exhaust stream when said NOx reduction demand is less than said first threshold and greater than or equal to a second threshold.

6. The method of claim 5 wherein said lean NOx catalyst reduces said NOx content in said exhaust stream when said NOx reduction demand is less than said second threshold.

7. The method of claim 5 wherein said step of introducing said HC is achieved via at least one of post-combustion in-cylinder fuel injection and in-exhaust injection downstream of said internal combustion engine.

8. The method of claim 5 further comprising selectively injecting hydrocarbon (HG) into said exhaust stream using a dosing unit that is disposed upstream of said lean NOx catalyst.

* * * * *